US008086204B2

(12) United States Patent
Uramoto et al.

(10) Patent No.: US 8,086,204 B2
(45) Date of Patent: Dec. 27, 2011

(54) RADIO RECEIVING APPARATUS

(75) Inventors: Yasutaka Uramoto, Kanagawa (JP); Tomohiro Yui, Kanagawa (JP)

(73) Assignee: Panasonic Corporation, Osaka (JP)

( * ) Notice: Subject to any disclaimer, the term of this patent is extended or adjusted under 35 U.S.C. 154(b) by 993 days.

(21) Appl. No.: 12/028,168

(22) Filed: Feb. 8, 2008

(65) Prior Publication Data

US 2008/0194221 A1 Aug. 14, 2008

(30) Foreign Application Priority Data

Feb. 9, 2007 (JP) .................................. 2007-030947

(51) Int. Cl.
H04B 1/10 (2006.01)
(52) U.S. Cl. .................... 455/296; 455/287.1; 455/307; 375/346; 375/348
(58) Field of Classification Search .................. 455/424, 455/425, 456.5, 456.6, 561, 550.1, 575.1, 455/63.1, 67.11, 501, 67.13, 180.1, 296, 455/307, 278.1; 375/346, 355, 350, 144, 375/148, 285, 345, 349; 333/167, 176, 178, 333/179; 327/290, 523
See application file for complete search history.

(56) References Cited

U.S. PATENT DOCUMENTS

| | | | | |
|---|---|---|---|---|
| 5,235,298 A * | 8/1993 | Banno et al. .................. 333/204 |
| 5,235,671 A * | 8/1993 | Mazor ........................... 704/200 |
| 5,307,515 A * | 4/1994 | Kuo et al. ..................... 455/295 |
| 5,493,717 A * | 2/1996 | Schwarz ........................ 455/306 |
| 5,715,282 A * | 2/1998 | Mansouri et al. ............. 375/350 |
| 6,901,243 B2 | 5/2005 | Jayaraman et al. |
| 6,990,160 B1 * | 1/2006 | Abe et al. ...................... 375/355 |
| 7,697,645 B2 * | 4/2010 | Jong .............................. 375/346 |
| 2003/0021367 A1 * | 1/2003 | Smith ........................... 375/346 |
| 2004/0092243 A1 * | 5/2004 | Hey-Shipton ................. 455/307 |
| 2004/0229561 A1 * | 11/2004 | Cowley et al. ............... 455/3.01 |
| 2004/0229590 A1 * | 11/2004 | Kubo et al. ................... 455/307 |
| 2005/0069065 A1 * | 3/2005 | Oh et al. ....................... 375/350 |
| 2005/0164665 A1 * | 7/2005 | Suganuma ................. 455/278.1 |
| 2008/0214134 A1 * | 9/2008 | Shi et al. ...................... 455/295 |
| 2010/0029235 A1 * | 2/2010 | Bouillet ..................... 455/226.2 |

FOREIGN PATENT DOCUMENTS

JP 2004-336536 11/2004

OTHER PUBLICATIONS

English language Abstract of JP 2004-336536.

* cited by examiner

*Primary Examiner* — Duc Nguyen
*Assistant Examiner* — Charles Chow
(74) *Attorney, Agent, or Firm* — Greenblum & Bernstein, P.L.C.

(57) ABSTRACT

The radio receiving apparatus includes an adaptive receive filter capable of detecting an interference wave and an out-of-band noise level correctly and improving reception performance. The radio receiving apparatus has a plurality of filters, a received signal power meter that measures the overall received signal power, a calculator that performs calculation that associates the measured received signal power with an output of AGC, an interference power meter that measures signal power in a frequency band outside a necessary band of the received signal, a comparator that compares the calculation result by the calculator with a specific threshold, and switches that select a filter to be adopted from the plurality of filters based on the outputs of comparators. The radio receiving apparatus detects adjacent interference based on signal power in the frequency band outside the signal band and detects the noise level based on the power level at an antenna end.

12 Claims, 6 Drawing Sheets

RADIO RECEIVING APPARATUS

CROSS REFERENCE TO RELATED APPLICATIONS

The disclosure of Japanese Patent Application No. 2007-030947, filed on Feb. 9, 2007 including the specification, drawings and abstract, is incorporated herein by reference in its entirety.

BACKGROUND OF THE INVENTION

1. Field of the Invention

The present invention relates to a radio receiving apparatus with an adaptive receive filter.

2. Description of Related Art

A receiving apparatus in wireless communication, may receive signals on which signals from channels other than the communicating channel are superimposed, which is referred to as "interference." When interference is caused, unless interference waves, which are an unnecessary signal with respect to a desired signal to be demodulated essentially, are canceled, demodulation characteristics deteriorate substantially. Therefore, it is necessary to cancel interference waves using a filter of a relatively narrow band and transfer a signal having high signal quality (referred to as "SNR") to later processing on the assumption that a band necessary for a signal of each communication standard and channel separation are wide. To perform the above-described processing, a receiving apparatus may include a receive filter. As this receive filter, a receive filter having a single frequency characteristic can be used as long as desired reception performance is satisfied. However, depending on communication standards, it may be difficult to cancel interference wave and secure necessary band with a single receive filter. That is, when a single narrow-band receive filter is employed to cancel interference waves, a frequency band of the received signal is cut too much, and, as a result, reception performance for the case where there is no interference wave may not be satisfied. Alternatively, when a receive filter of a relatively wide band is employed to satisfy reception performance for the case where there is no interference wave, interference waves cannot be canceled sufficiently, and, as a result, reception performance for the case where there are interference waves may not be satisfied. In this case, there is a measure of changing the types of the receive filter depending on whether or not there are interference waves, for example, making coefficients variable, or adopting a receive filter configuration providing a plurality of filters such as filters for interference cancellation and filters used when there is no interference wave, and selectively adopting a filter. As a receive filter which selectively adopts a plurality of filters, there is, for example, a reception filtering method disclosed in Patent Document 1 (Japanese Patent Application Laid-Open No. 2004-336536).

FIG. 1 is a block diagram showing the configuration of the radio receiving apparatus with the adaptive receive filter disclosed in Patent Document 1.

In FIG. 1, radio receiving apparatus 10 is configured with antenna 11, PGA (Programmable Gain Amplifier) 12, A/D converter 13, adaptive receive filter section 20, filter selecting section 21 and modulation scheme determining section 22.

The reception filtering method of radio receiving apparatus 10 determines a modulation scheme from known information, which is included in the received signal per predetermined processing unit called "time slot."

However, whether or not there are interference waves does not depend on the modulation scheme, and so this conventional reception filtering method cannot decide correctly whether or not there are interference waves, and reception performance may deteriorate as a result of cutting the signal band more than necessary, or reception performance may deteriorate as a result of insufficient interference wave cancellation. That is, the point in the configuration of the filter-selective receive filter is that whether or not interference waves can be detected at high accuracy.

Further, the intersymbol interference canceling method disclosed in Patent Document 1 determines the modulation scheme of a received signal and determines whether or not to adopt an intersymbol interference canceling filter based on that information. However, the intersymbol interference canceling filter generally has a characteristic of lifting the signal level toward a high frequency band. Therefore, when the intersymbol interference canceling filter is simply adopted, the out-of-band noise level increases, which leads to signal quality (SNR) deterioration, and, as a consequence, reception performance deteriorates. Therefore, when an intersymbol interference canceling filter is adopted, reception performance cannot be improved without judging the out-of-band noise level quantitatively and deciding whether or not to adopt the intersymbol interference canceling filter based on that result.

In this way, with a radio receiving apparatus having an adaptive receive filter, when channel separation is narrower than the signal bandwidth, it is difficult to cancel adjacent interference and secure signal band with one receive filter. Further, there are requirements for the noise level when an intersymbol interference canceling filter is adopted, and it is difficult to decide the noise level correctly from the received signal.

SUMMARY OF THE INVENTION

It is therefore an object of the present invention to provide a radio receiving apparatus with an adaptive receive filter that detects interference waves and out-of-band noise level correctly and improves reception performance.

According to an aspect of the invention, a radio receiving apparatus of the present invention adopts a configuration including: a filtering section that is configured with a plurality of filters that filter a received signal; a signal power measuring section that measures a signal power of the received signal; and a filter selecting section that selects a filter to be adopted from the filtering section based on information obtained in the signal power measuring section.

DETAILED DESCRIPTION OF THE PREFERRED EMBODIMENT

Embodiments of the present invention will be described in detail below with reference to the accompanying drawings.

Embodiment 1

Figure 1:
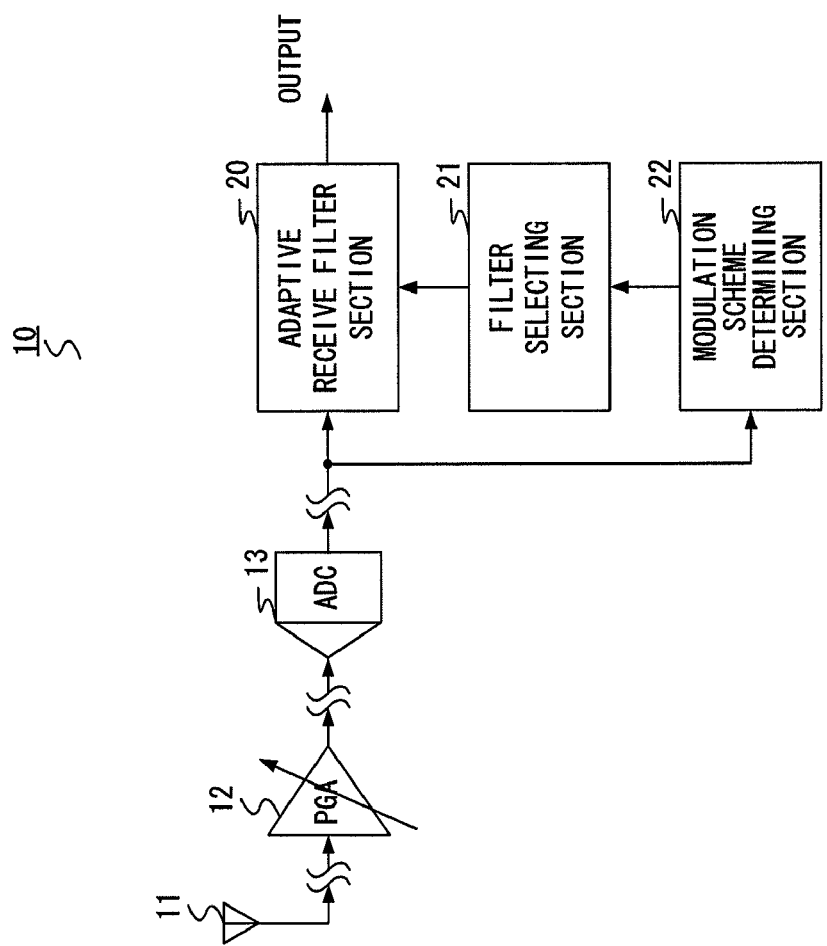
FIG. 1 is a block diagram showing a configuration of a radio receiving apparatus with a conventional adaptive receive filter.
Figure 2:
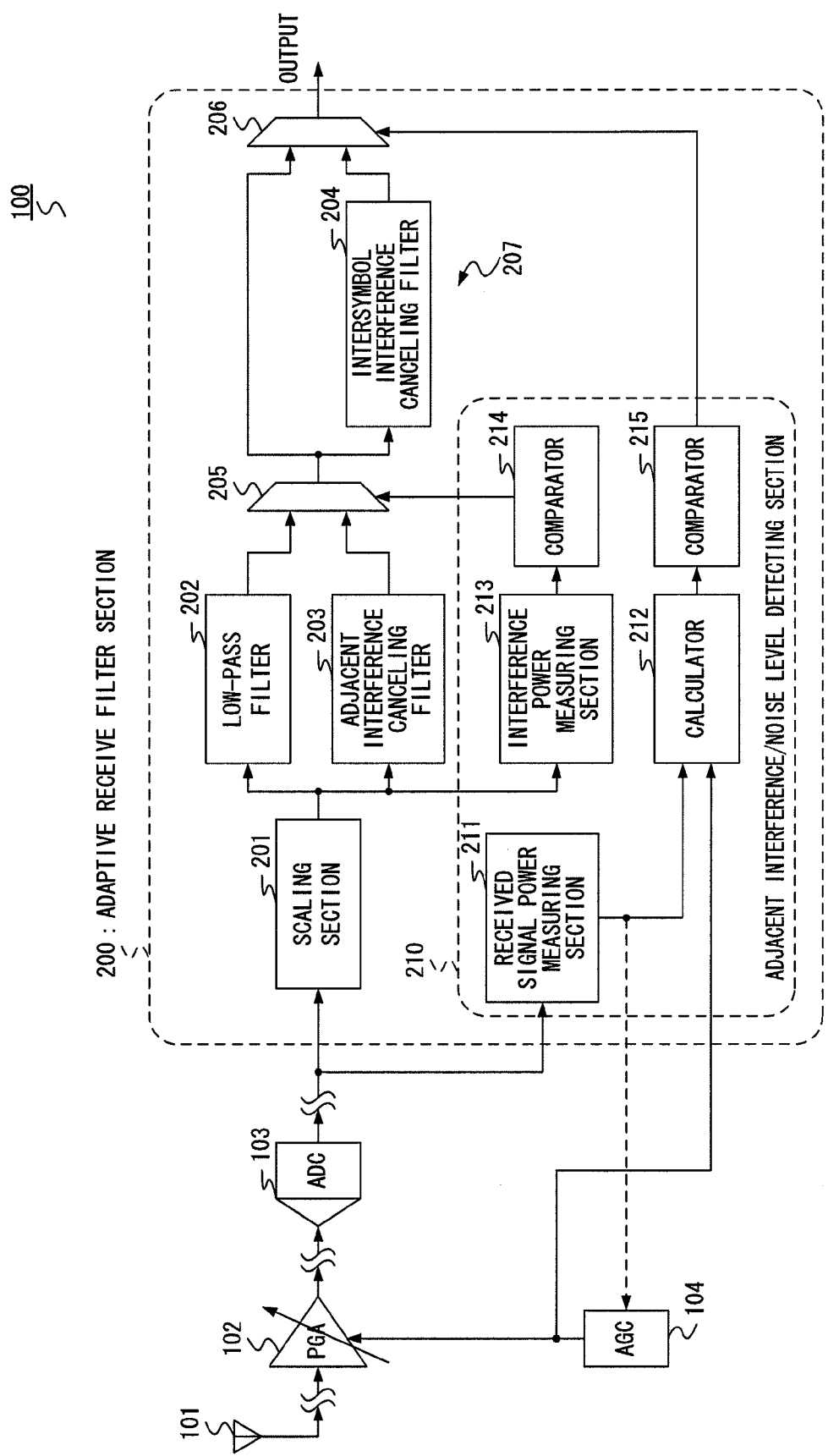
FIG. 2 is a block diagram showing a configuration of a radio receiving apparatus with an adaptive receive filter according to Embodiment 1 of the present invention.

FIG. 2 is a block diagram showing the configuration of the radio receiving apparatus with the adaptive receive filter according to Embodiment 1 of the present invention and shows the configuration from the antenna to the adaptive receive filter of the radio receiving apparatus.

In FIG. 2, radio receiving apparatus 100 is configured with antenna 101, PGA 102 that changes the level of the received signal, A/D converter 103, AGC (Automatic Gain Controller) 104 which is a gain adjusting section of the analog part, scaling section 201, low-pass filter 202 which is a normal receive filter not intended for use in interference cancellation, adjacent interference canceling filter 204 that cancels intersymbol interference, switches 205 and 206, received signal power measuring section 211, calculator 212, interference power measuring section 213 and comparators 214 and 215.

In FIG. 2, in the RF section and the analog baseband section, circuit elements which are not directly related to the present invention are omitted from the figure. They include, for example, an LNA (Low Noise Amplifier) mixer and filter.

Scaling section 201, low-pass filter 202, adjacent interference canceling filter 203, intersymbol interference canceling filter 204, switches 205 and 206, received signal power measuring section 211, calculator 212, interference power measuring section 213 and comparators 214 and 215 configure adaptive receive filter section 200 as a whole. Further, received signal power measuring section 211, calculator 212, interference power measuring section 213 and comparators 214 and 215 configure adjacent interference/noise level detecting section 210.

Scaling section 201 scales the received signal to a specific level and cancels level fluctuation due to fading.

Low-pass filter 202, adjacent interference canceling filter 203 and intersymbol interference canceling filter 204 configure filtering section 207 with a plurality of filters that filter the received signal. Filtering section 207 may include a plurality of filters in addition, depending on purposes.

Switches 205 and 206 select a filter to be adopted from filtering section 207 using a control signal from adjacent interference/noise level detecting section 210. For example, switch 205 receives a control signal from comparator 214 and switches between low-pass filter 202 and adjacent interference canceling filter 203. Switch 206 receives a control signal from comparator 215 and switches between selecting and not selecting intersymbol interference canceling filter 204. The arrangement of switches shown in FIG. 2 is one example, and an appropriate number of switches are arranged at an appropriate number of stages according to the filter configuration of filtering section 207.

Adjacent interference/noise level detecting section 210 measures the signal power of the received signal, generates a control signal for selecting a filter to be adopted from filtering section 207 based on signal power measurement information and outputs the control signal to switches 205 and 206.

It is not always necessary to make filtering section 207 operate under specific conditions, and only a specific filter among filtering section 207 is selected and used.

In this embodiment, adaptive receive filter section 200 has scaling section 201, detects an adjacent interference wave by comparing the absolute values of the output from interference wave power measuring section 213 and a specific threshold by comparator 214, makes filtering section 207 operate, and cancels the adjacent interference.

Received signal power measuring section 211 measures power of the signal inputted to adaptive receive filter section 200. In this embodiment, the overall received signal power is measured without scaling the received signal.

Interference power measuring section 213 measures interference wave power of the received signal. Here, interference power measuring section 213 measures signal power in the frequency band outside the necessary band of the output from scaling section 201.

Comparators 214 and 215 compare the input value with a specific threshold and outputs the comparison result to switches 205 and 206 as a control signal of adjacent interference/noise level detecting section 210.

Adjacent interference/noise level detecting section 210 and switches 205 and 206 configure a filter selecting section. Calculator 212 performs calculation for associating the output from AGC 104 with the output from received signal power measuring section 211, and comparator 215 compares this calculation result with a specific threshold, detects the noise level of the received signal and outputs the comparison result to switch 206. Switch 206 switches between the output of switch 205 and the output of intersymbol interference canceling filter 204. By this means, when the noise level is low, intersymbol interference canceling filter 204 for canceling adjacent interference is selected from filtering section 207 to cancel intersymbol interference, and, when the noise level is high, intersymbol interference canceling filter 204 is not selected, and intersymbol interference is not canceled.

Further, in adjacent interference/noise level detecting section 210, comparator 214 compares the absolute values of the output from interference power measuring section 213 and a specific threshold and detects an adjacent interference wave, and intersymbol interference canceling filter 204 is selected from filtering section 207 based on this comparison result.

The operation of radio receiving apparatus 100 having adaptive receive filter section 200 configured as described above will be described below.

Radio receiving apparatus 100 lowers the frequency of the signal received at antenna 101 to a baseband frequency band at an RF section (not shown). Then, PGA 102 adjusts the received signal with the frequency band decreased to the baseband frequency band to be the target level, and ADC 103 converts the signal to a digital signal and inputs the digital signal to adaptive receive filter section 200. PGA 102 is controlled by AGC 104, which is provided to maintain the received signal level fixed.

Scaling section 201 cancels the level fluctuation of the signal inputted by adaptive receive filter section 200 due to fading, and inputs the result to low-pass filter 202 and adjacent interference canceling filter 203. The outputs of low-pass filter 202 and adjacent interference canceling filter 203 are both inputted to switch 205. Switch 205 is controlled by a control signal from adjacent interference/noise level detecting section 210, and outputs one of the inputted signals to intersymbol interference canceling filter 204 and switch 206. The output signal of intersymbol interference canceling filter 204 is inputted to switch 206. Switch 206 is controlled by adjacent interference/noise level detecting section 210, and selects and outputs one of the outputs from switch 205 and intersymbol interference canceling filter 204.

Switches 205 and 206 are adequately controlled by adjacent interference/noise level detecting section 210 depending on whether or not there is adjacent interference and whether the noise level is high or low. By this means, radio receiving apparatus 100 can realize high reception performance. Adjacent interference/noise level detecting section 210 controls switch 205 such that the output of adjacent interference canceling filter 203 is outputted from switch 205 when there is adjacent interference, and the output of low-pass filter 202 is outputted from switch 205 when there is no adjacent interference. Further, adjacent interference/noise level detecting section 210 controls switch 206 such that the output of switch 205 is outputted from switch 206 when the noise level is high, and the output of intersymbol interference canceling filter 204 is outputted from switch 206 when the noise level is low.

Adjacent interference/noise level detecting section 210 performs the following operations. Interference power measuring section 213 measures interference wave power from the output from scaling section 201, and outputs the measured interference wave power to comparator 214. Comparator 214 compares the output from interference power measuring section 213 with a specific threshold, and detects whether or not there is adjacent interference from the comparison result. For example, when the output from interference power measuring section 213 is equal to or greater than a predetermined threshold, comparator 214 determines that there is adjacent interference.

Further, the received signal converted to the digital signal is inputted to received signal power measuring section 211, and received signal power measuring section 211 measures power of the signal inputted to adaptive receive filter section 200, and outputs the measurement result to calculator 212. Calculator 212 performs calculation of multiplying the output from received signal power measuring section 211 by the gain value outputted from AGC 104 and inputted to PGA 102. The calculation result of calculator 212 is an estimated value of the received signal power at antenna 101. Comparator 215 compares the calculation result of calculator 212 with a specific threshold, judges the degree of the noise level from the comparison result, and outputs a control signal for controlling switch 206 based on the comparison result.

The operation of above-described adjacent interference/noise level detecting section 210 will be described in more detail.

First, adjacent interference detection will be described. Interference power measuring section 213 measures interference power. There are various measuring methods. The methods include extracting the signal just outside the signal band unique to the modulation scheme according to the communication standard using a narrow-band filter, and measuring power. The methods also include deciding the signal level of the necessary frequency band correctly using the fast Fourier transform (FFT). However, with the latter method, it is necessary to implement an FFT circuit, and, as a consequence, necessary to take into consideration an increase in circuit area.

Next, noise level detection will be described. The mechanism of estimating the received signal power level at antenna 101 is as follows. The received signal at antenna 101 is amplified at PGA 102 and inputted to adaptive receive filter section 200, and so the received signal power at antenna 101 can be estimated by attenuating power of the signal inputted to adaptive receive filter section 200 by the amount amplified by PGA 102. Further, White Gaussian noise produced in the RF section (not shown) is predominant and this noise level does not fluctuate substantially, and so, if the received signal power at antenna 101 can be estimated, it naturally follows that the SNR of the signal inputted to adaptive receive filter section 200 can be estimated.

With the above-described detection mechanism, it is possible to detect correctly whether or not there is adjacent interference and whether the noise level is high or low, and by appropriately selecting filters based on these detection results, it is possible to realize high reception performance.

As described above, according to this embodiment, adaptive receive filter section 200 of radio receiving apparatus 100 has: scaling section 201 that scales the received signal to a specific level; filtering section 207 that is configured with low-pass filter 202 and adjacent interference canceling filter 203; received signal power measuring section 211 that measures the overall received signal power; calculator 212 that performs calculation of associating the measured received signal power with the output of AGC 104; interference power measuring section 213 that measures signal power in a frequency band outside the necessary frequency band of the received signal; comparator 214 that compares the output of interference power measuring section 213 with a specific threshold; comparator 215 that compares the calculation result of calculator 212 with a specific threshold; and switches 205 and 206 that select a filter to be adopted from filtering section 207 based on the outputs of comparator 214 and comparator 215, and adopts a basic configuration of selecting an appropriate filter using detection information of adjacent interference and noise level. Particularly, by detecting the adjacent interference based on the signal power in a frequency band outside the signal band and by detecting the noise level based on the power level at the antenna end, it is possible to improve accuracy of detecting adjacent interference and noise level and improve reception performance.

Embodiment 2

Figure 3:
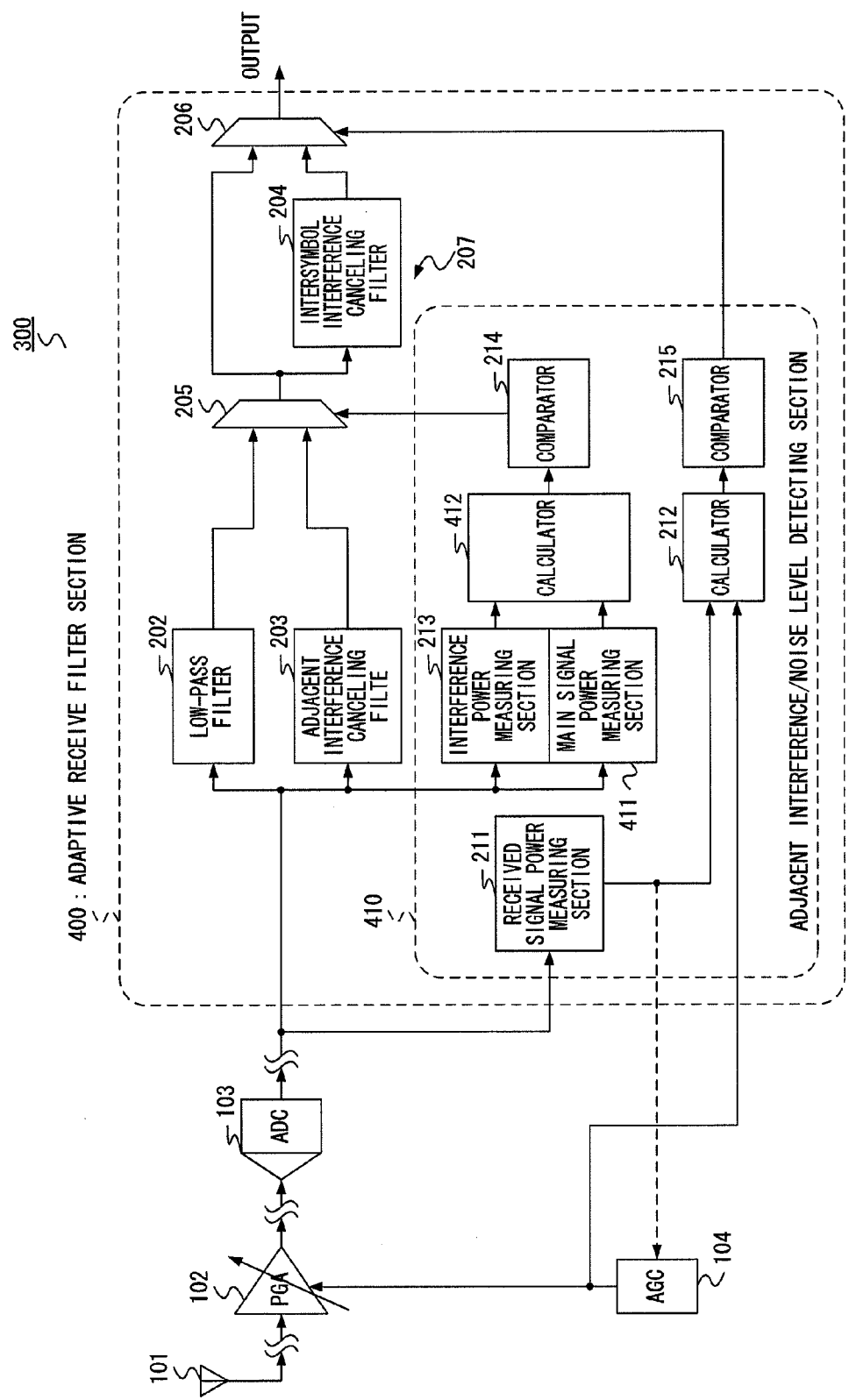
FIG. 3 is a block diagram showing a configuration of a radio receiving apparatus with an adaptive receive filter according to Embodiment 2 of the present invention.

FIG. 3 is a block diagram showing the configuration of the radio receiving apparatus with the adaptive receive filter according to Embodiment 2 of the present invention. The same components as those in FIG. 2 will be assigned the same reference numerals without further explanations.

In FIG. 3, radio receiving apparatus 300 has antenna 101, PGA 102, A/D converter 103, AGC 104, low-pass filter 202, adjacent interference canceling filter 203, intersymbol interference canceling filter 204, switches 205 and 206, received signal power measuring section 211, calculator 212, interference power measuring section 213, main signal power measuring section 411, calculator 412 and comparators 214 and 215.

Low-pass filter 202, adjacent interference canceling filter 203, intersymbol interference canceling filter 204, switches 205 and 206, received signal power measuring section 211, calculator 212, interference power measuring section 213, main signal power measuring section 411, calculator 412 and comparators 214 and 215 configure adaptive receive filter section 400 as a whole. Further, received signal power measuring section 211, calculator 212, interference power measuring section 213, main signal power measuring section 411, calculator 412 and comparators 214 and 215 configure adjacent interference/noise level detecting section 410.

Main signal power measuring section 411 measures main signal power of the received signal.

Calculator 412 performs calculation such as calculation of the ratio between the main signal power and interference wave power and calculation of absolute value comparison, on the output of interference power measuring section 213 and the output of main signal power measuring section 411, and detects whether or not there are interference waves from the calculation result.

In this way, in adjacent interference/noise level detecting section 410, the components from adaptive receive filter section 200 to scaling section 201 in FIG. 2 are omitted, and the received signal is directly inputted to received signal power measuring section 211, low-pass filter 202, adjacent interference canceling filter 203, interference power measuring section 213 and main signal power measuring section 411. Therefore, received signal power measuring section 211 measures the overall received signal power without scaling by scaling section 201 (FIG. 2).

The operation of radio receiving apparatus 300 having adaptive receive filter section 400 configured as described above will be described below. The filter selecting operation of adaptive receive filter section 400 is the same as in Embodiment 1, and therefore descriptions thereof will be omitted.

In this embodiment, scaling section 201 that scales the signal inputted to adaptive receive filter section 400 to a specific level, is omitted. By this means, power level fluctuation due to fading cannot be canceled, and so main signal power measuring section 411 and calculator 412 are added instead.

Calculator 412 performs calculation on the output of interference power measuring section 213 and the output of main signal power measuring section 411, and detects whether or not there are interference waves from the calculation results. To be more specific, calculator 412 calculates a power ratio between a main signal and interference waves, for example. That is, by canceling out the absolute fluctuation of interference power due to fading with the power fluctuation of the main signal due to fading, the power level of the interference waves is decided. By this means, it is possible to detect interference waves correctly without scaling section 201.

Embodiment 3

Figure 4:
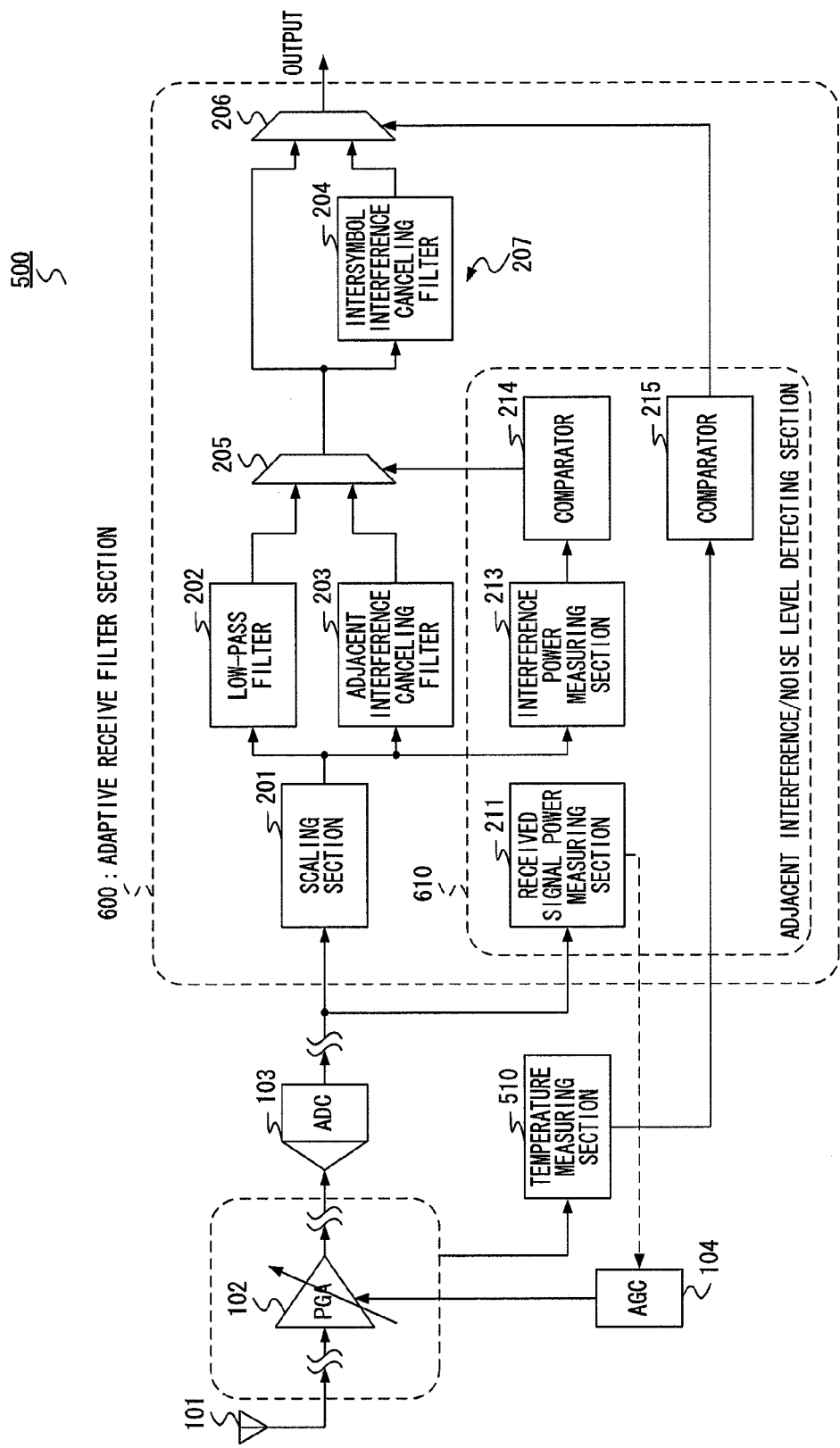
FIG. 4 is a block diagram showing a configuration of a radio receiving apparatus with an adaptive receive filter according to Embodiment 3 of the present invention.

FIG. 4 is a block diagram showing the configuration of the radio receiving apparatus with the adaptive receive filter according to Embodiment 3 of the present invention. The same components as those in FIG. 2 will be assigned the same reference numerals without further explanations.

In FIG. 4, radio receiving apparatus 500 has antenna 101, PGA 102, A/D converter 103, AGC 104, temperature measuring section 510 that measures temperature in an RF section and analog baseband section, scaling section 201, low-pass filter 202, adjacent interference canceling filter 203, intersymbol interference canceling filter 204, switches 205 and 206, received signal power measuring section 211, interference power measuring section 213 and comparators 214 and 215.

Scaling section 201, low-pass filter 202, adjacent interference canceling filter 203, intersymbol interference canceling filter 204, switches 205 and 206, received signal power measuring section 211, interference power measuring section 213 and comparators 214 and 215 configure adaptive receive filter section 600 as a whole. Further, received signal power measuring section 211, interference power measuring section 213 and comparators 214 and 215 configure adjacent interference/noise level detecting section 610.

The operation of radio receiving apparatus 300 having adaptive receive filter section 600 configured as described above will be described below. The filter selecting operation of adaptive receive filter section 600 is the same as that in Embodiment 1, and therefore descriptions thereof will be omitted.

It is a feature of this embodiment to detect the noise level using the output of temperature measuring section 510. Most of the noise component included in the signal inputted to adaptive receive filter section 600 is thermal noise in the RF section, and so, by measuring the temperature in the RF section to estimate the amount of noise, judging whether or not to adopt intersymbol interference canceling filter 204 using that result and controlling switch 206 correctly, reception performance is improved. Noise in the RF section does not fluctuate substantially, and so this configuration provides an advantage of monitoring an increase and decrease in noise due to temperature change caused by move of the receiving apparatus and judging whether or not to adopt intersymbol interference canceling filter 204 more correctly and appropriately.

Embodiment 4

Figure 5:
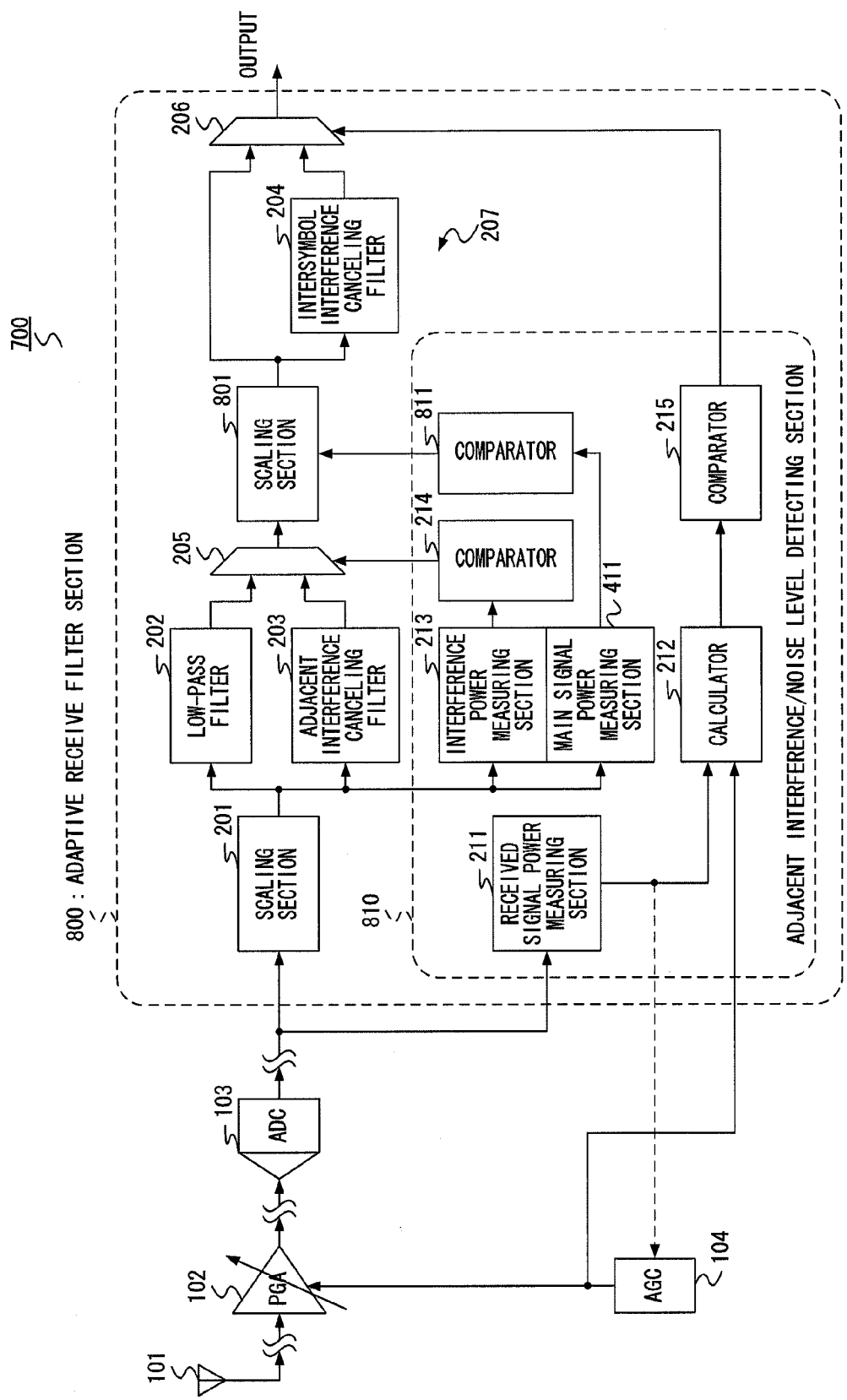
FIG. 5 is a block diagram showing a configuration of a radio receiving apparatus with an adaptive received filter according to Embodiment 4 of the present invention.

FIG. 5 is a block diagram showing the configuration of the radio receiving apparatus with the adaptive receive filter according to Embodiment 4 of the present invention. The same components as those in FIG. 2 and FIG. 3 will be assigned the same reference numerals without further explanations.

In FIG. 5, radio receiving apparatus 700 has antenna 101, PGA 102, A/D converter 103, AGC 104, scaling section 201, low-pass filter 202, adjacent interference canceling filter 203, scaling section 801, intersymbol interference canceling filter 204, switches 205 and 206, received signal power measuring section 211, calculator 212, interference power measuring section 213, main signal power measuring section 411 and comparators 214, 215 and 811.

Scaling section 201, low-pass filter 202, adjacent interference canceling filter 203, scaling section 801, intersymbol interference canceling filter 204, switches 205 and 206, received signal power measuring section 211, calculator 212, interference power measuring section 213, main signal power measuring section 411 and comparators 214, 215 and 811 configure adaptive receive filter section 800 as a whole. Further, received signal power measuring section 211, calculator 212, interference power measuring section 213, main signal power measuring section 411 and comparators 214, 215 and 811 configure adjacent interference/noise level detecting section 810.

In this embodiment, scaling section 801 is provided after switch 205. When adjacent interference/noise level detecting section 810 judges that there is adjacent interference, the output of adjacent interference canceling filter 203 is outputted to switch 205. However, when the interference level is much greater than the main signal, there is a problem that the overall signal power becomes small by canceling adjacent interference. In this case, most part of the signal band is cut by narrow-band adjacent interference canceling filter 203, and, in addition, signal power is small, and therefore reception performance may not be expected to be improved.

To avoid this, in this embodiment, the main signal level of the output of scaling section 201 is measured in advance by main signal power measuring section 411, and, when this power is lower than a specific threshold, and it is detected that there is adjacent interference, scaling section 801 amplifies the output of adjacent interference canceling filter 203 with the lowered power level. By this means, it is possible to improve reception performance reliably.

Embodiment 5

Figure 6:
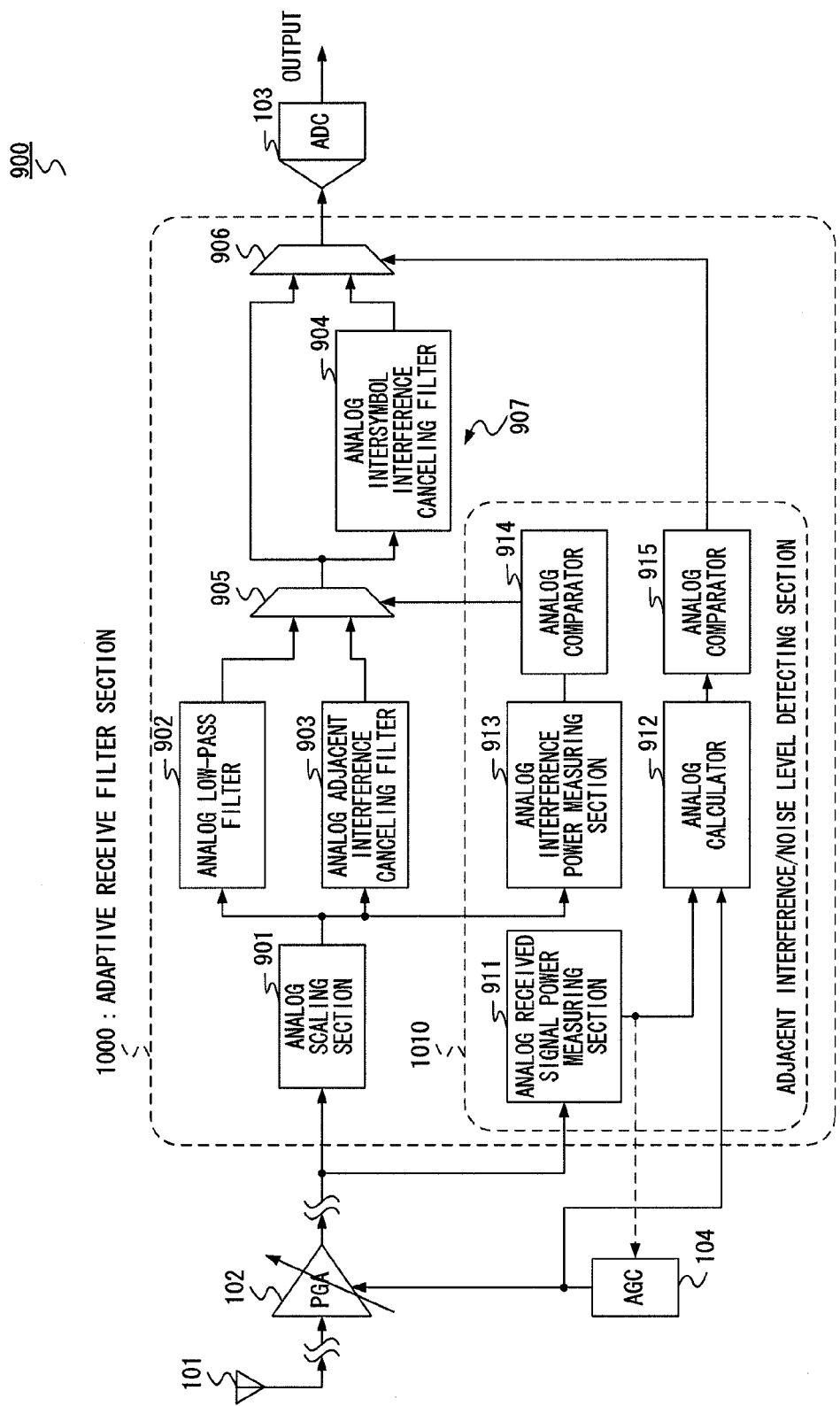
FIG. 6 is a block diagram showing a configuration of a radio receiving apparatus with an adaptive receive filter according to Embodiment 5 of the present invention.

FIG. 6 is a block diagram showing the configuration of the radio receiving apparatus with the adaptive receive filter according to Embodiment 5 of the present invention. The same components as those in FIG. 2 will be assigned the same reference numerals without further explanations.

In FIG. 6, radio receiving apparatus 900 has antenna 101, PGA 102, AGC 104, analog scaling section 901, analog low-pass filter 902, analog adjacent interference canceling filter 903, analog intersymbol interference canceling filter 904, analog switches 905 and 906, analog received signal power measuring section 911, analog calculator 912, analog interference power measuring section 913, analog comparators 914 and 915 and A/D converter 103.

Analog scaling section 901, analog low-pass filter 902, analog adjacent interference canceling filter 903, analog intersymbol interference canceling filter 904, analog switches 905 and 906, analog received signal power measuring section 911, analog calculator 912, analog interference power measuring section 913 and analog comparators 914 and 915 configure adaptive receive filter section 1000 as a whole. Further, analog received signal power measuring section 911, analog calculator 912, analog interference power measuring section 913 and analog comparators 914 and 915 configure adjacent interference/noise level detecting section 1010.

Analog low-pass filter 902, analog adjacent interference canceling filter 903 and analog intersymbol interference canceling filter 904 configure filtering section 907 with a plurality of filters that filter the received signal. Filtering section 907 may include a plurality of filters in addition, depending on purposes.

It is a feature of this embodiment to implement most of circuit elements configuring adaptive receive filter section 200 with analog elements. Adaptive receive filter section 1000 is configured with the analog circuit elements shown in FIG. 6.

According to this embodiment, it is possible to transmit a clear signal with adjacent interference being canceled, to input of A/D converter 103 provided after adaptive receive filter section 1000. Further, by suppressing amplitude fluctuation due to fading using analog scaling section 901, it is possible to maintain the input level of A/D converter 103 relatively stable. By this means, it is possible to receive the following two advantages.

(1) The signal level (target level) inputted to A/D converter 103 is stable, and so the target level can be set high, and it is thereby possible to utilize the dynamic range of A/D converter 103 at a maximum.

(2) The bandwidth of the signal inputted to A/D converter 103 is controlled adequately, and so the requirement for bandwidth for A/D converter 103 can be relaxed, and it is thereby possible to realize lower consumption in A/D converter 103.

The above-described two advantages make it possible to improve reception performance substantially.

The above descriptions are examples of the preferred embodiments of the present invention, and the scope of the present invention is not limited to this.

For example, although Embodiment 5 is an example where adaptive receive filter section 200 of Embodiment 1 is implemented with analog elements, Embodiments 2 and 4 can be also implemented with analog circuit elements in the same way as Embodiment 5. According to this configuration, as described above, a clear signal can be inputted to A/D converter 103, and it is therefore possible to utilize the dynamic range of A/D converter 103 at a maximum.

Also, the above embodiments can be implemented with software as well as hardware. In this case, more flexible configuration can be realized, and the configuration is extremely useful when cognitive radio and the like are taken into consideration.

Further, in this embodiment, although the terms "adaptive receive filter" and "radio receiving apparatus" are used for ease of explanation, other terms such as "receiving apparatus" and "reception filtering method" can also be used.

Further, circuit sections configuring above-described adaptive receive filter, for example, the type of filter, the number of taps, connection method, and the type of switch are not limited to the above-described embodiments.

As described above, according to the present invention, whether or not there is adjacent interference can be detected correctly, and by preserving a necessary band when there is no adjacent interference, and by canceling adjacent interference when there is adjacent interference, it is possible to provide a radio receiving apparatus that satisfies reception performance under both conditions where there is adjacent interference and conditions where there is no adjacent interference.

Further, in intersymbol interference cancellation, the noise level can be decided correctly, and it is thereby possible to judge correctly whether or not to adopt an intersymbol interference canceling filter. By this means, intersymbol interference can be canceled without deteriorating an SNR due to an increase in an out-of-band noise level, and it is possible to improve reception performance.

Therefore, the radio receiving apparatus according to the present invention can preserve a signal band and cancel adjacent interference, and cancel intersymbol interference without increasing noise, and the radio receiving apparatus is particularly useful as a receive filter of a receiving terminal in communication standards where channel separation is narrow with respect to the signal band. Further, the present invention can provide the same advantages in wired communication as well as wireless communication and is a useful invention.

What is claimed is:

1. A radio receiving apparatus comprising:
a gain adjuster that adjusts gain of an analog part,
a plurality of filters that filter a received signal;
a signal power meter that measures signal power of the received signal, and comprises a received signal power meter that measures overall signal power of the received signal; and
a filter selector that selects a filter to be adopted from the plurality of filters based on information obtained in the signal power meter,
wherein the filter selector performs calculation that associates an output from the gain adjuster with an output from the received signal power meter, detects a noise level of the received signal by comparing the calculation result with a specific threshold, selects an intersymbol interference canceling filter that cancels adjacent interference from the plurality of filters and cancels intersymbol interference when the noise level is low, and does not select the intersymbol interference canceling filter and does not cancel the intersymbol interference when the noise level is high.

2. The radio receiving apparatus according to claim 1, wherein the plurality of filters comprise at least:
an adjacent interference canceling filter that cancels an adjacent interference wave;
the intersymbol interference canceling filter that cancels intersymbol interference; and
a low-pass filter not intended for canceling interference.

3. The radio receiving apparatus according to claim 1, wherein the signal power meter comprises:
 an interference power meter that measures signal power in a frequency band outside a necessary band of the received signal; and
 a main signal power meter that measures main signal power of the received signal.

4. The radio receiving apparatus according to claim 3, wherein the filter selector detects an adjacent interference wave by comparing absolute values of an output from the interference power meter and a specific threshold and selects a filter for canceling adjacent interference from the plurality of filters based on the comparison result.

5. The radio receiving apparatus according to claim 3, wherein the filter selector performs calculation that associates an output from the interference power meter with an output from the main signal power meter, detects an adjacent interference wave by comparing the calculation result with a specific threshold, and selects a filter for canceling adjacent interference from the plurality of filters based on the comparison result.

6. The radio receiving apparatus according to claim 1, wherein the filter selector selects a specific filter from the plurality of filters under specific conditions.

7. The radio receiving apparatus according to claim 1, further comprising a first scaler that scales the received signal to a specific level,
 wherein the signal power meter measures signal power of an output from the first scaler.

8. The radio receiving apparatus according to claim 1, wherein:
 the plurality of filters comprise at least:
  an adjacent interference canceling filter that cancels an adjacent interference wave;
  the intersymbol interference canceling filter that cancels intersymbol interference; and
  a low-pass filter not intended for canceling interference;
 the signal power meter comprises:
  an interference power meter that measures signal power in a frequency band outside a necessary band of the received signal; and
  a main signal power meter that measures main signal power of the received signal; and
 the radio receiving apparatus further comprises:
  a first scaler that scales the received signal to a specific level; and
  a second scaler that scales an output of the adjacent interference canceling filter based on an output from the main signal power meter.

9. The radio receiving apparatus according to claim 1, further comprising a temperature meter that measures temperature in the analog part provided before the plurality of filters,
 wherein the filter selector selects a filter to be adopted from the plurality of filters based on temperature information measured by the temperature meter.

10. The radio receiving apparatus according to claim 1, wherein the plurality of filters, the signal power meter and the filter selector are configured with digital circuits.

11. The radio receiving apparatus according to claim 1, wherein the plurality of filters, the signal power meter and the filter selector are configured with analog circuits.

12. A radio receiving apparatus comprising:
 a plurality of filters that filter a received signal:,
 a signal power meter that measures signal power of the received signal;
 a filter selector that selects a filter to be adopted from the plurality of filters based on information obtained in the signal power meter; and
 a temperature meter that measures temperature in an analog part provided before the plurality of filters,
 wherein the filter selector detects a noise level of the received signal by comparing an output of the temperature meter with a specific threshold, selects an intersymbol interference canceling filter for canceling adjacent interference from the plurality of filters and cancels intersymbol interference when the noise level is low, and does not select the intersymbol interference canceling filter and does not cancel the intersymbol interference when the noise level is high.

* * * * *